United States Patent [19]

Bourgeois

[11] 4,033,529

[45] July 5, 1977

[54] DROGUE RELEASE APPARATUS

[75] Inventor: Armand E. Bourgeois, Manchester, N.H.

[73] Assignee: Sanders Associates, Inc., Nashua, N.H.

[22] Filed: Feb. 27, 1976

[21] Appl. No.: 662,196

[52] U.S. Cl. .............................. 244/151 B; 9/8 R
[51] Int. Cl.² .................................. B64D 17/38
[58] Field of Search ....... 244/151 R, 151 A, 151 B, 244/142, 147; 294/83 A; 24/230 R, 218, 216, 215, 213 C; 9/8 R; 102/13; 340/2

[56] References Cited

UNITED STATES PATENTS

| | | | |
|---|---|---|---|
| 2,371,640 | 3/1945 | Manson et al. | 244/138 R |
| 2,521,516 | 9/1950 | Heidman et al. | 294/83 A |
| 2,526,791 | 10/1950 | Wroblewski | 24/218 |
| 2,880,687 | 4/1959 | Kilvert | 244/151 B |
| 3,079,188 | 2/1963 | Oswold | 24/218 |
| 3,921,120 | 11/1975 | Widenhofer | 9/8 R |

*Primary Examiner*—Trygve M. Blix
*Assistant Examiner*—Galen L. Barefoot
*Attorney, Agent, or Firm*—Louis Etlinger; Robert K. Tendler

[57] ABSTRACT

Drogue release apparatus for air-dropped sonobuoys is disclosed in which the drogue is attached to a spring-loaded release unit which is carried at the top surface of the sonobuoy, with an ejection spring positioned between the release unit and the top of the sonobuoy to eject the release unit upon water impact. A second spring acts normally as a detent to prevent ejection and is freed to permit ejection of the release unit upon impact by the momentary downward travel of the release unit as a result of the impact.

6 Claims, 9 Drawing Figures

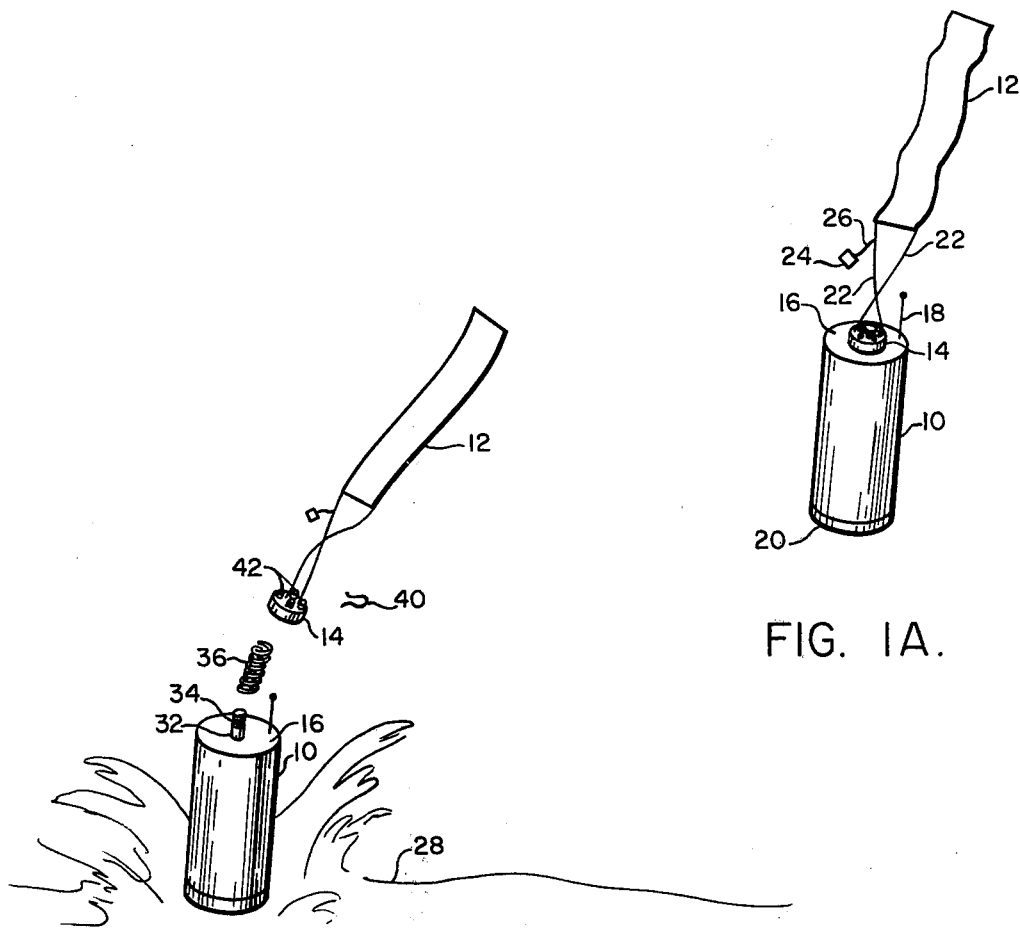
FIG. 1A.
FIG. 1B.
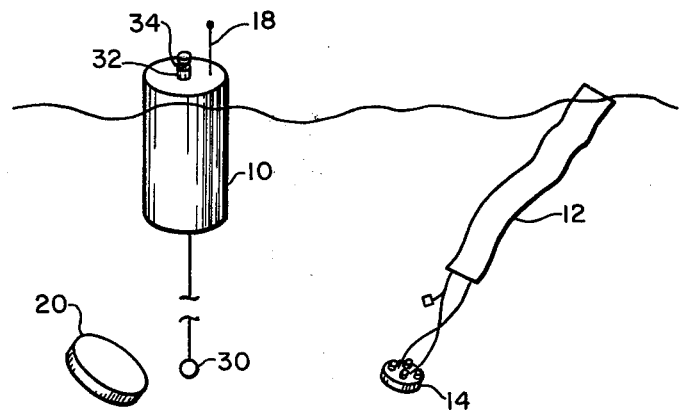
FIG. 1C.

DROGUE RELEASE APPARATUS

FIELD OF INVENTION

This invention relates to air-dropped sonobuoy apparatus and more particularly to a method and apparatus for releasing the drogue or parachute attached to the air-dropped apparatus upon water impact.

BACKGROUND OF THE INVENTION

One of the problems associated with air-dropped sonobuoys or other type air-dropped apparatus is the problem of the release of the drogue or parachute once the sonobuoy has impacted the surface of a body of water. The reason that it is desirable to release the drogue is that its lines may become entangled with the sonobuoy and thereby cause the sonobuoy to be dragged by the drogue due to either local current or wave action. In the case of sonobuoys which transmit subsurface information to overflying aircraft, it is important to maintain the vertical orientation of the sonobuoy so that the range of the sonobuoy will not be diminished. It will be appreciated that if the sonobuoy is pulled from its vertical position to an essentially horizontal position it is likely that the antenna carried by the sonobuoy will be submerged beneath the surface of the ocean and thus the range of the sonobuoy will be limited.

In the past there have been many complicated release mechanisms some of which have been cumbersome and unreliable due to jamming of some of the elements making up the release mechanism. Of course if the drogue is not reliably released, the sonobuoy may not either deploy its payload or transmit subsurface information and additional sonobuoys must then be deployed.

Moreover, the range of impact velocities over which the release mechanism must work varies greatly in that sonobuoys may be ejected from as little as twenty five feet over the surface of the ocean from a helicopter or from as much as 50,000 feet, when the sonobuoys are released by high-flying jet aircraft. Thus, in order for the release mechanism to be universally applicable it must operate over a wide range of impact conditions. Not only must a wide range of impact conditions be accommodated but also the swinging motion of the sonobuoy as it descends may cause the sonobuoy to enter the ocean at other than a vertical orientation. In some instances the entry angle of the sonobuoy may be as much as 60° from the vertical, which in some instances may cause the release unit to malfunction due to canting of the release apparatus.

The foregoing problems in reliability are solved by the subject invention in which the drogue for the air-dropped article is attached to a spring-loaded release unit which is carried at the top surface of the sonobuoy, with an ejection spring positioned between the release unit and the top of the sonobuoy to eject the release unit upon water impact. A second spring is provided which acts normally as a detent to prevent ejection and is freed upon impact by the momentary downward travel of the release unit against its ejection spring as a result of the impact to permit ejection of the release unit. Reliability of the release unit is in part achieved by its simplicity of operation and in part by its light weight.

In one embodiment the release unit is placed over a central post which projects above the top surface of the sonobuoy. The post projects through a central bore in the release unit and the release unit is held in place by a U-shaped release spring at the top of the release unit. The U-shaped spring serves as a detent coacting with an annular groove at the top of the post. When the release unit is in place and is spring loaded from beneath, as by an ejection spring placed between the release unit and the sonobuoy, the U-shaped spring prevents upward movement of the release unit. In assembling the unit, the U-shaped spring is compressed around the post in the annular groove and is held in place and restrained against outward movement by pins or the like which project upwardly from the top surface of the release unit adjacent the ends of the U-shaped spring. Upon water impact the weight of the release unit depresses the ejection spring and the release unit translates downwardly on the post. As the release unit moves downwardly the pins move downwardly and out of engagement with the ends of the U-shaped spring. As a result, due to the spring tension the U-shaped spring springs open and out of engagement with the annular groove which results in the upward ejection of the release unit away from the sonobuoy.

Put another way, upon impact the mass of the release unit momentarily depresses the ejection spring and the unit moves downwardly moving the pins away from the ends of the U-shaped spring. The U-shaped spring then pops open and away from the notched post thereby unlocking the release unit. Immediately after impact the release unit is propelled by the ejection spring upwardly and off of the post away from the sonobuoy carrying the drogue with it.

It is an important feature of this invention that after the release unit and drogue are propelled away from the sonobuoy, the weight of the release unit causes the drogue to sink thereby carrying the drogue to the bottom of the ocean and away from the sonobuoy so that the sonobuoy cannot foul in the drogue or its attaching strands.

It is therefore an object of this invention to provide improved release mechanism for drogue apparatus associated with air-dropped articles which impact the surface of a body of water.

It is another object of this invention to provide a reliable release mechanism for sonobuoys ejected above the surface of a body of water in which release is effectuated upon water impact.

It is another object of this invention to provide an impact release unit which is spring-biased and locked into place with another spring member which is released upon the downward travel of the release unit at impact.

It is a still further object of this invention to provide a reliable impact release mechanism including the combination of a spring-biased release unit and a spring utilized as a detent locking member in which the spring detent is released at impact due to the translation of the release unit as a result of the impact.

These and other objects will be better understood in connection with the remainder of the specification in conjunction with the drawings in which

BRIEF DESCRIPTION OF THE DRAWINGS

FIGS. 1A–1C illustrate the operation of the subject invention in connection with an air-dropped sonobuoy prior to, during, and after impact of the sonobuoy;

DETAILED DESCRIPTION

Figure 2:
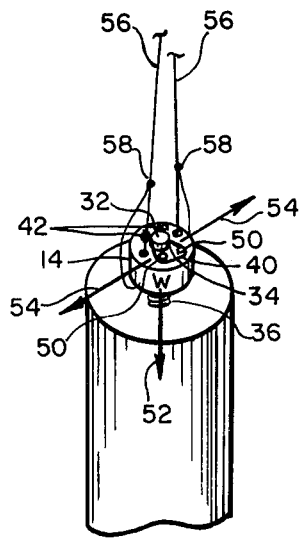
FIG. 2 is a diagrammatic representation of the subject invention illustrating the direction of translation of the release unit during impact and the motion of the spring detent at impact.

Referring now to FIGS. 1A–1C, air-dropped apparatus such as a sonobuoy 10 which is stabilized or slowed down by a drogue 12 in the form of a parachute, streamer, or other descent limiting device is provided with a drogue release unit 14 located at the top 16 of sonobuoy 10. Typically a sonobuoy has an antenna, here illustrated at 18, extending upwardly from the top surface. At the bottom of the sonobuoy package is a releasable end cap 20 which is released after water impact so that apparatus carried internal to the sonobuoy may be deployed beneath the surface of the ocean.

The drogue apparatus is attached to the release unit by means of strands or lines 22, with the release unit forming a releasible coupling between the drogue and the sonobuoy. A safety member or block 24 to prevent accidental actuation is carried on a strand 26, which is itself attached to one of the strands from the drogue. When the drogue is deployed, the safety block is pulled out of the release unit by the wind loading on the drogue.

As illustrated in FIG. 1A a drogue in the form of a streamer streams out above the sonobuoy as the sonobuoy descends through the earth's atmosphere. As illustrated in FIG. 1B, when sonobuoy 10 impacts the surface of the ocean, here illustrated diagrammatically by reference character 28, the release unit is ejected from the top of the sonobuoy and, as illustrated in FIG. 1C, due to the weight of the release unit the drogue and the release unit are carried to the bottom of the ocean, thereby preventing the fouling of the sonobuoy with the drogue and the drogue release apparatus. As illustrated in FIG. 1C, upon impact, releasable end cap 20 is ejected and subsurface apparatus generally indicated by reference character 30 is deployed beneath the sonobuoy. Subsurface activity detected by apparatus 30 is transmitted via antenna 18 to overflying aircraft for further processing.

Referring back for a moment to FIG. 1B, the release unit is carried on a central post 32 which has an annular groove 34 at the top of the post. An ejection spring 36 is carried coaxially about the post and is positioned between the bottom surface of release unit 14 and top surface 16 of the sonobuoy. As will be described hereinafter, release unit 14 is locked in place on post 32 by compressing ejection spring 36 and then locking it with a spring detent member 40 which is positioned at the top of the release unit. In one embodiment this member is in the form of a U-shaped spring which, when the release unit is in place over post 32, is compressed into the annular groove on the post such that its spring tension maintains an outward force on the ends of the spring. The U-shaped spring is held in place by pins, projections or protuberances 42 which extend only a small distance above the top surface of the release unit.

In operation, upon impact, the release unit due to its weight momentarily translates on the post, compresses ejection spring 36 and pins 42 come out of contact with the end of the U-shaped spring. As illustrated, the U-shaped spring opens up and comes out of communication with the groove in the post. When this happens, the ejection spring propells the release unit along with the drogue upwardly as illustrated, thereby detaching the drogue from the sonobuoy. After release the drogue is dragged to the bottom of the ocean by virtue of the weight of the release unit, where it is out of the way of the sonobuoy.

It will be appreciated that what has been provided is a spring-biased release unit which is held in place by a bent spring which serves as a detent. The detent communicates with a detent receiving means in the form of a groove or indentation on a post. In its assembled position the spring detent is in other than its normal rest position and is held there by pins in one embodiment. The release unit is released upon the downward translation of the release unit on post 32 from a predetermined assembled position at impact. Because a spring detent is utilized there need be no complicated unlocking or release apparatus since one piece of apparatus both springs open upon impact and comes out of communication with the annular groove on the top of the post. Due to the simplicity of the above-mentioned apparatus, drogue chutes or banners are reliably released. Moreover, by changing the weight of release unit 14 and the force of ejection spring 36, it is possible to provide a selection of impact deceleration ranges under which the subject apparatus will operate. For instance, the impact deceleration under which the subject apparatus will operate varies from 50 to 200 G's with a release unit weighing approximately 3 ounces and an ejection spring exerting a force of approximately 1.8 pounds. The weight of the release unit and the force of the ejection spring will vary, based on specific design requirements.

Referring now to FIG. 2, the release unit 14 is in the shape of a relatively thick disc which has a central bore, although the shape of the release unit is not critical and other shapes are within the scope of this invention. In this embodiment, the disc is slipped over post 32 and compresses ejection spring 36 in so doing. The disc is pushed downwardly sufficient to expose groove 34 at the top surface of the disc. In this embodiment in addition to pins 42 on the top surface of the disc, additional pins 50 are provided around which U-shaped spring detent member 40 is deformed. In the deformed position the ends of the spring detent are positioned in groove 34 such that upward movement of the disc is prevented since the spring detent bears against the top surface of the disc as well as the top surface of the groove. When the release unit is used with a chute, there is an approximate shock load of typically 1400 pounds on the release mechanism at the moment the chute is deployed. By changing the cross sectional size of the U-shaped spring detent member 40, post 32, groove 34, the mechanical reliability of the release unit is insured for a given set of conditions.

Upon impact the disc moves downwardly in the direction of arrow 52 which causes pins 42 to come out of contact with the ends of the U-shaped detent spring. The spring then springs open in the direction illustrated by arrows 54 and the disc is released and ejected as described hereinbefore. As can be seen in this diagram the drogue apparatus is attached to the disc via strands 56 which pass through holes at the periphery of the disc and are doubled back on themselves and secured as illustrated at 58. Alternatively, the strands may be passed through the disc and knotted.

Figure 3:
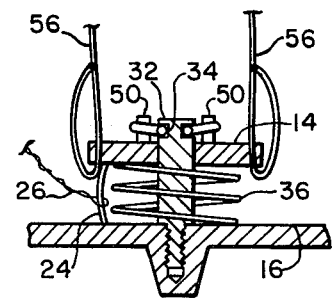
FIG. 3 is a sectional diagram of the release unit in its assembled position, its ejection spring and the post on which it translates during impact.
Figure 4:
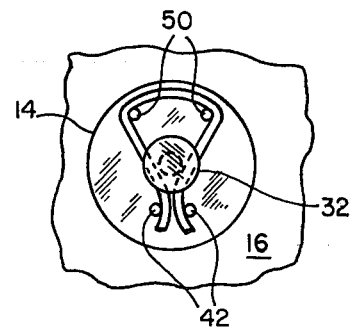
FIG. 4 is a top view of the apparatus of FIG. 3.

Referring to FIG. 3, post 34 is shown in cross section with release unit 14 positioned at the top of the post just below groove 34. Ejection spring 36 is positioned between the bottom surface of the release unit and top surface 16 of the air-dropped apparatus. Safety member 24, here in the form of a plate, is positioned between top surface 16 and the bottom surface of the release unit to prevent the downward movement of the release unit prior to deployment of the drogue. A top view of this apparatus is illustrated in FIG. 4 in which elements common to FIGS. 2, 3, and 4 have like reference characters.

Figure 5:
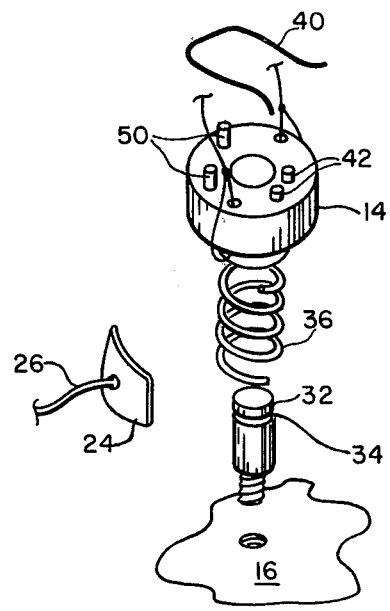
FIG. 5 is an exploded diagram of the subject invention.

Referring to FIG. 5 the subject apparatus is illustrated in exploded form, again with like elements having like reference characters. In this diagram it can be seen that pins 42 are considerably shorter than bosses 50 so that slight movement or translation of the release unit in a downward direction will effectively release the ends of the U-shaped detent spring.

It will be appreciated that the spring detent may take on many forms such as a leaf spring anchored at one end to the release unit so that it is tensioned inwardly and held in place with a single pin, or spring biased split collars positioned in the groove on the post may be used.

Figure 6:
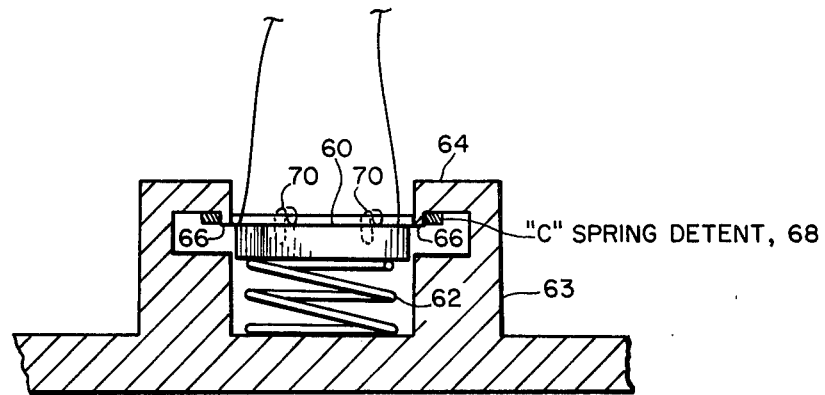
FIG. 6 is a diagram of an alternative embodiment.

Moreover, it will be appreciated that the subject invention can take on other forms utilizing a detent spring and the downward movement on impact for freeing the detent spring. For instance as illustrated at FIG. 6, a release unit 60 can be spring biased by an ejection spring 62 in a housing 63 having an overhanging and apertured lip structure 64 with downwardly depending bosses 66. A C spring detent 58 tensioned to move inwardly is sprung open 15 after the release unit is positioned in the housing to prevent upward movement of the release unit. Hooks 70 attached to the release unit are hooked around the detent spring to pull it down upon impact. At impact the C spring collapses allowing the ejection of the release unit.

Figure 7:
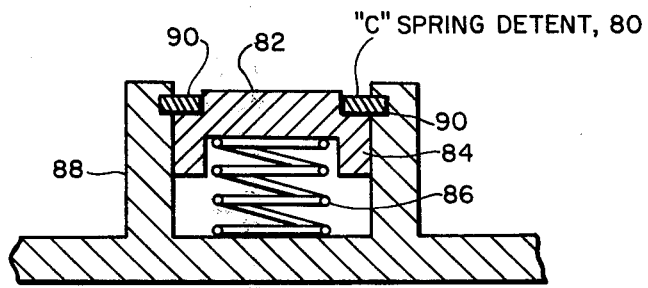
FIG. 7 is a diagram of a further alternative embodiment.

In a still further alternative embodiment, as illustrated in FIG. 7, a C-shaped spring detent 80, tensioned to move inwardly, may be maintained in an expanded position by a centrally located boss portion 82 of a spring loaded release unit 84 which is spring biased in an upward direction by an ejection spring 86. The release unit is mounted for reciprocation in a housing 88 which has an annular notched portion 90 adapted to receive the expanded C spring detent.

In operation, upon impact release unit 84 travels downwardly depressing release spring 86. At this time centrally located boss portion 82 comes out of contact with the inner portion of the C spring detent and the C spring detent collapses coming out of engagement with housing 88. Upon the collapse of the C spring the release unit is free to move upwardly and is ejected by ejection spring 86.

What has therefore been provided is a spring biased release unit in combination with spring detent means carried by the release unit which cooperates with both the release unit and detent receiving means to lock the release unit in place. Upon impact of the apparatus the spring detent is freed and the release unit is ejected. In this manner a single element is utilized for the locking and unlocking.

Since in one embodiment the spring detent is carried on an exposed top surface of the release unit, upon impact it flies clear of all apparatus so as to prevent jamming. With the locking mechanism completely clear, the release unit is also thrown clear. This results in an exceptionally reliable system for the removal of the drogue apparatus as all parts of the apparatus for coupling the drogue to the air-dropped article are thrown completely clear of the article. As mentioned hereinbefore not only is the drogue and its associated apparatus thrown clear, but due to the weight of the release unit which is still attached to the drogue, both the drogue and the release unit sink clear of the water borne apparatus.

Although a specific embodiment to the invention has been described in considerable detail for illustrative purposes, many modifications will occur to those skilled in the art. It is therefore desired that the protection afforded by Letters Patent be limited only by the true scope of the appended claims.

What I claim is:

1. Apparatus for releasably coupling drogue apparatus to an article ejected into the earth's atmosphere comprising:
    a release unit;
    means for attaching said drogue apparatus to said release unit;
    spring biasing means for projecting said release unit away from said article; and
    means for locking said release unit to said article during descent and for unlocking said release unit at impact including: a member attached to and projecting above said article, said member having detent receiving means adjacent the top thereof; a detent spring located on top of said release unit and adapted to engage said detent receiving means to prevent movement of said release unit away from said article; and means at the top of said release unit which engages one end of said detent spring for maintaining said detent spring in a position other than its normal rest position and in coacting engagement with said detent receiving means when said release unit is in a predetermined assembled position and for releasing said detent spring upon translation of said release unit against said spring biasing means and away from said predetermined assembled position due to impact.

2. The apparatus of claim 1 wherein said release unit includes a bore therethrough and wherein said member projects through said bore.

3. Apparatus for releasing a drogue from an article ejected into the earth's atmosphere upon impact of said article comprising:
    a spring biased release unit for attaching said drogue to said article, and
    means for locking said release unit to said article against spring biased release during descent and for unlocking said release unit as said release unit translates against the spring biasing upon impact, said means including:
    a detent spring caried at the top of said article,
    a member projecting above said article having detent spring receiving means at the top thereof, and
    at least one limited length pin on the top of said release unit for bending said detent spring into cooperation with said detent spring receiving means during descent and for releasing said detent spring when said pin translates away from said detent spring with translation of said release unit at impact.

4. The apparatus of claim 3 wherein said detent spring is U-shaped.

5. The apparatus of claim 3 wherein said release unit includes a bore adapted to receive said projecting member and wherein said detent spring receiving means exists above said release unit when said release unit is in place.

6. The apparatus of claim 5 wherein said detent spring is U-shaped.

* * * * *